Patented May 6, 1924.

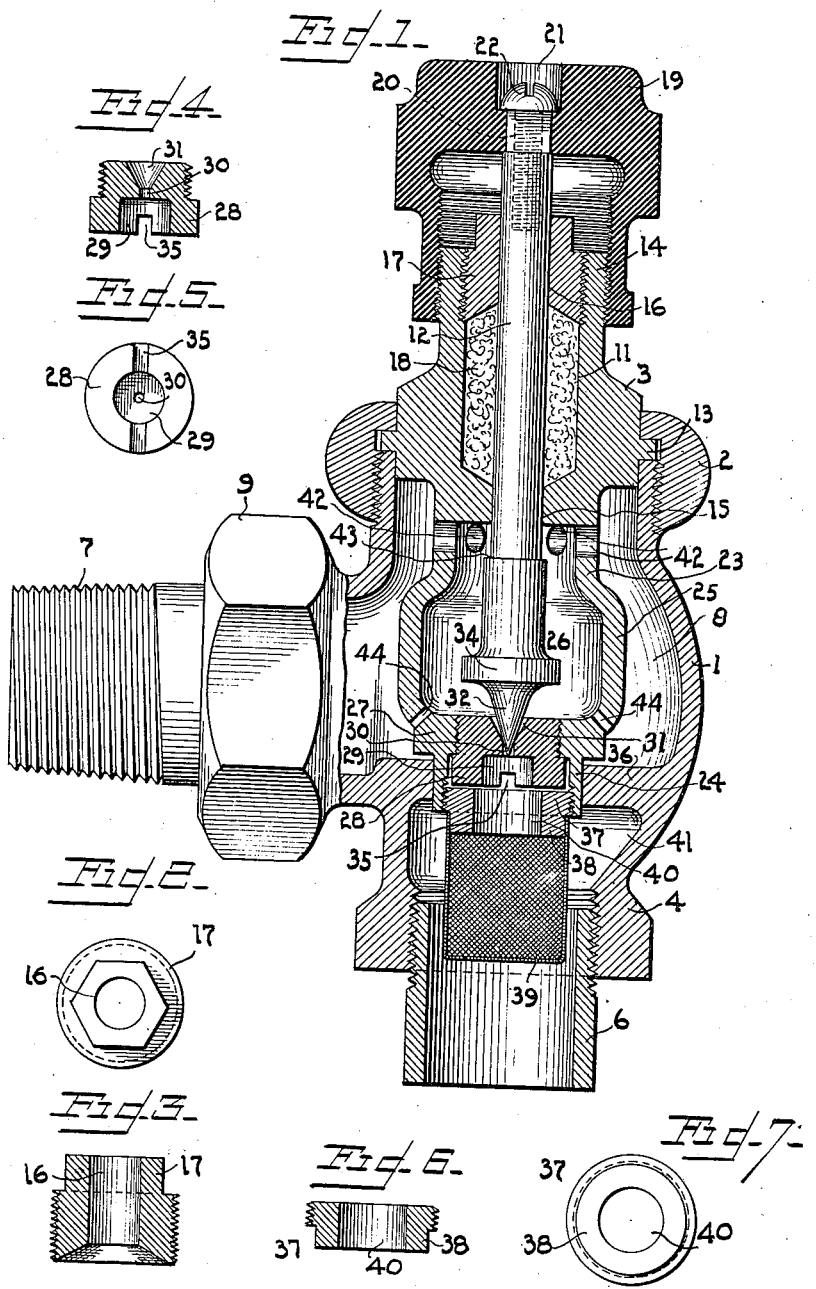

1,493,409

UNITED STATES PATENT OFFICE.

EDGAR C. WILEY, OF LYNCHBURG, VIRGINIA, ASSIGNOR TO SIMPLEX HEATING SPECIALTY COMPANY, INC., OF LYNCHBURG, VIRGINIA, A CORPORATION OF VIRGINIA.

STEAM-RADIATOR VALVE.

Application filed January 31, 1922. Serial No. 533,031.

*To all whom it may concern:*

Be it known that I, EDGAR C. WILEY, a citizen of the United States, residing at Lynchburg, in the county of Campbell and State of Virginia, have invented a new and useful Steam-Radiator Valve, of which the following is a specification.

This invention relates to steam radiator valves, and is more particularly directed to a valve to be used in connection with a variable pressure steam heating system.

The primary object of the invention is to provide the valve with a restricted orifice or steam passage, which shall be proportioned in each individual valve to the special requirements of the radiator with which the valve is used, in such a manner that when a maximum pressure is carried in the steam supply pipe, each steam passage or orifice will pass just sufficient steam to heat the entire radiator, and when the pressure in the supply pipe is reduced, the radiator will be partially heated according to such reduced pressure, thus providing for a wholesale graduation of the heat supply throughout the system to suit the varying weather conditions.

A further object of the invention is to prevent, by means of a strainer, the clogging of the small orifice or steam passage with pipe scale, or other foreign matter passing through the heating system, and should clogging occur, to permit the greatest accessibility of the valve structure for cleaning the orifice or its protecting strainer.

Another object of the invention is to provide a valve construction which will eliminate the objectionable noises ordinarily resulting from a high velocity of steam passing through an orifice under pressure ranging from one to ten pounds.

The invention will be best understood from a consideration of the following detailed description taken in connection with the accompanying drawing forming part of this specification, with the understanding, however that the invention is not confined to any strict conformity with the showing in the drawing, but may be changed and modified so long as such changes and modifications mark no material departure from the salient features of the invention as expressed in the appended claims.

In the drawing:—

Fig. 1 is a vertical section of the radiator valve.

Fig. 2 is a plan view of the packing gland.

Fig. 3 is a vertical section of the gland.

Fig. 4 is a vertical section of the bushing provided with the restricted steam passage or orifice.

Fig. 5 is a bottom plan view of the same.

Fig. 6 is a vertical section of the threaded ferrule which supports the strainer.

Fig. 7 is a bottom plan view of the same.

Referring to the drawing, 1 designates an ordinary form of radiator valve body of the union bonnet type, having a reduced threaded upper end, engaged by a union nut 2 for clamping the bonnet 3 to the body 1. The lower end 4 of the body is reduced in diameter, and is internally threaded to receive the threads of a steam pipe connection 6, which, in turn, is connected to the feed pipes of the steam heating system.

A nipple or threaded connection 7, which forms the outlet for the chamber 8 of the valve body, is adapted to be screwed into a threaded opening in a radiator. A union nut 9 connects the nipple to the valve body.

The upper part of the bonnet 3 is provided with a stuffing box 11, for a valve stem 12, and forms a closure for the upper reduced end of the valve body 1. Extending from the bonnet is an annular flange 13, which is seated upon the upper end of the valve body 1, and is engaged by the inturned annular flange on the union nut 2, whereby when the nut 2 is screwed down tight upon the valve body 1, the bonnet 3 will be held in rigid position centrally of the chamber 8. The upper end of the bonnet is formed with a reduced cylindrical portion 14, which is internally and externally threaded. The stuffing box 11 extends through the reduced portion 14, and the valve stem passing centrally through the bonnet, traverses the opening 15 below the stuffing box, and another opening 16 in the packing gland 17, which has a threaded engagement with the internal threads of the reduced portion 14.

A packing 18 is located within the stuffing box to prevent the escape of steam from the upper end of the bonnet when the gland 17 is screwed in position.

An internally threaded composition rubber valve handle 19 engages the external threads on the reduced end 14 of the bonnet. The handle is provided with a central bore 20 and a countersunk recess 21, in which recess is seated the head of a screw 22, screwed into an internally threaded passage in the upper end of the stem 12, whereby the handle 19 is rigidly secured to said stem.

The valve bonnet 3 at its lower end is expanded in cylindrical form to provide an enlarged inner muffler shell 25, above and below which are reduced portions 23, 24, and said shell forms a chamber 26. The base 27 of said chamber 26 is provided with a central internally threaded passage, into which is screwed a bushing 28 having an opening 29, and a restricted central cylindrical passage or orifice 30 leading from the opening 29 into a flared or conical-shaped seat 31, opening into the chamber 26 of the bonnet 3. The lower face of the bushing 28 is slotted at 35 for the insertion of the end of a screw driver, whereby the bushing may be adjusted or removed from the lower end of the bonnet.

Adapted to seat within the passage 30 and the flared seat 31 is a conical or pointed valve 32, which has its smaller end at the bottom. The top of the conical valve 32 is enlarged into an annular deflector 34 formed on the valve stem 14, said deflector in connection with valve 32 serving to direct or deflect steam passing through the port or passage 30 outwardly and against the walls of the chamber 26 of the bonnet 3. The opening 30 is drilled or reamed to form a flared or countersunk seat 31 in order to provide capacity for different sizes of radiators, and therefore the main bearing point of the valve will not be seriously affected and the travel of the valve materially lengthened.

Furthermore, rotary movement of the conical valve 32 in the restricted passage 30 and the cone-shaped seat 31 of said passage, will tend to grind away any pipe scale or other foreign matter which may be deposited within this passage, so that by rotation of the conical valve 32 by the handle 19, the passage will be freed from any obstructions or accumulations of matter.

The central threaded passage in the base 27 which receives the bushing 28 is slightly larger in diameter than the deflector 34 to permit the valve and its stem to be withdrawn or inserted through said passage when necessary.

The reduced end 24 of the bonnet 3 fits neatly within a central opening in a diaphragm 36 formed near the lower end of the valve body 1, and projects below the diaphragm, the latter providing a partition between the chamber 8 and the lower reduced end 4 of said body. An auxiliary chamber 41 is formed below the diaphragm 36 in the body member 1.

The reduced lower end 24 of the bonnet 3 is internally threaded and adapted to receive an externally threaded ferrule 37, which has a collar 38, upon which is firmly secured a strainer 39, which depends below the bonnet 3 and into the steam pipe connection 6, the strainer may be secured to the collar 38, as by soldering, brazing, or in any other well known manner. The ferrule has a centrally disposed passage 40 leading from the strainer to the opening 29 of the bushing 28.

In the reduced portion 23 of the bonnet 3 is formed a series of perforations 42, which are adapted to permit steam in the chamber 26 of the bonnet 3 to pass out from said chamber into the chamber 8 of the valve body and strike the inner surface of the valve body.

A shoulder 43 on the valve stem 12 limits the upward travel of said valve stem so that the turning movement of the valve handle 19 is limited.

Ports 44 are located in the base of the shell 25 to permit any condensation products of the steam to drain from said shell, which would otherwise accumulate in said shell at such times when the valve is closed or almost closed.

The operation of my device is as follows:

Steam entering through the connection 6 passes upwardly through the strainer 39 and also fills the chamber 41. In passing through the strainer, the steam escapes through the passage 40 and opening 29, entering the restricted passage 30 of the bushing 28, then through the flared or cone-shaped seat 31, and is then spread outwardly in all directions by the gentle curving of the valve point and deflector 34. The steam is thus gradually and silently expanded without undue agitation. It then changes its direction and is diffused in its upward passage to the upper end of the chamber 26 of the shell, whence it will pass out through the perforations 42 in a horizontal direction and caused to strike the outer shell of the valve body 1, where it is again diffused downwardly and passes outwardly through the nipple 7, into the radiator connected with said nipple. As the steam passes through the chamber 26 of the bonnet and out through the perforations 42 and into the chamber 8 of the valve body, it will be found that a double muffling action is produced whereby objectionable noises are eliminated.

The steam in its passage upwardly is split by the conical valve 32, and caused to spread out in all directions, while the deflector 34 of the valve stem changes the direction of travel of the steam from vertical to horizontal, causing the steam to impinge against the walls of the chamber 26. The member 25 forms a muffler shell wherein the steam moving through the chamber 26 of the shell has its direction of movement frequently changed. It is these various changes of direction and diffusion of the steam which bring about the muffler action and so effectively reduce the noise to a very large degree.

In the case of clogging of the strainer or the valve passage 30, the combined bonnet and packing box may be bodily removed with the strainer 39 and bushing 28 upon the removal of the union nut 2. When the combined bonnet and stuffing box has been removed from the body 1, the strainer 39 may be readily unscrewed from the reduced end 24 of the bonnet and separately cleaned, and then by the insertion of a screw driver in the slot 35 of the bushing 28, the bushing may be removed and the restricted steam passage 30 may be properly cleaned and also the related parts. Matter which may have collected on the valve 32 may likewise be removed.

It is noted, in connection with the bonnet, that since all the parts just mentioned are carried by the bonnet, the working parts of the steam valve are made readily accessible for cleaning purpose. Nevertheless, the turning of the pointed end of valve 32 in the restricted passage 30 and the cone-shaped seat 31 provides for the automatic cleaning of the valve when in actual use, for the pointed end of the valve extends entirely through the passage.

What is claimed is: —

1. In a steam radiator valve, an outer casing, an inner muffler shell spaced from the casing and provided with a port for the admission of steam therein, a valve controlling the admission of steam through said port, and means on the valve for causing a directional change of the flow of steam as it leaves the port and enters the shell to cause the steam to be impinged on the inner face of the shell, said shell being provided with ports to permit the escape of steam to the outer casing.

2. In a steam radiator valve, a casing, a bonnet formed with an inner muffler shell provided with a port for the admission of steam, a valve for controlling the admission of steam into the shell through said port, means on the valve for bringing about a directional change in the flow of the steam in the muffler shell so as to cause the steam to be directed against the sides of the shell, said shell having an outlet for the escape of steam.

3. In a steam radiator valve, a casing having an inlet at the bottom and an outlet at one side, a bonnet formed with an inner muffler shell provided with a port for the admission therein of steam, means for controlling the flow of steam through the port and also for changing the direction of flow of the steam whereby the steam is forced against the sides of the shell, said shell being provided with ports to permit the escape of steam to the outer casing, said ports being so positioned as to direct the steam against the inner surface of the outer casing before it escapes through the outlet of the casing.

4. In a steam radiator valve, an outer casing, an inner muffler shell rigidly mounted in spaced relation to the casing, said shell being provided with outlet ports at the top, a bushing removably mounted in a passage at the base of said shell and having an inlet port with a conical-shaped seat opening into said shell, a valve controlling the admission of steam into said shell through said inlet port, said valve being conical with the smaller end entering said seat and provided with an annular deflector at the top of the valve, whereby steam entering through said port is given a directional change so as to cause it to strike the inner face of the shell before escaping through the outlet ports.

5. In a steam radiator valve, an outer casing, an inner muffler shell spaced from the outer casing a bushing provided with a steam port and mounted in the bottom of the muffler shell, and a valve entering the shell from the top and controlling said port, said muffler shell being provided with ports at the upper end leading into the outer casing.

6. In a steam radiator valve, a valve body, a bonnet removably mounted centrally of the valve body and provided with an inner muffler shell, a reduced portion located at the top of the shell, said reduced portion being provided with ports leading into the valve body, a removable bushing in the bottom of the shell having an inlet port, a valve extending into the bonnet and shell and adapted to open or close the inlet port, and means for admitting steam to the inlet port.

7. In a steam radiator valve, a valve body, a bonnet removably mounted centrally of the valve body and provided with a muffler chamber spaced from the body, said bonnet being provided with spaced reduced portions located at the top and bottom of the chamber, the upper reduced portion being provided with ports leading into the valve body, a removable bushing in the bottom of the shell having an inlet port, a valve located in the chamber adapted to open or close the inlet port, a removable ferrule located below the bushing and provided with a depending strainer, said ferrule being connected to the lower reduced portion, means for admitting steam to the valve body below the strainer, said bonnet, valve, bushing, ferrule and strainer being adapted to be removed bodily as a unit from the valve body.

8. In a steam radiator valve, a valve body, a valve stem provided with a conical valve, a bushing provided with a restricted orifice for the admission of steam, said orifice being cylindrical in form and having a conical seat of greater diameter than the contiguous portion of the valve, the valve being pointed and having its pointed end entering the cylindrical part of the orifice, said valve being provided at the top with a deflector for the steam.

9. In a steam radiator valve, a valve body having an inlet at the bottom and outlet at one side, a valve bonnet removably mounted within the valve body and provided with a chamber having an inlet at its bottom for the admission of steam to said chamber, a stem provided with a conical valve, means for operating the valve stem longitudinally of the valve bonnet, said chamber in the valve bonnet being provided with ports at the upper end leading into the valve body, said valve being provided with means for changing the direction of steam passing through the inlet port to direct the steam against the sides of said chamber, the steam from the chamber being adapted to escape through the ports at the upper end so as to strike the valve body before it escapes through the outlet.

10. In a steam radiator valve, a valve body having an inlet and an outlet with a diaphragm between the inlet and outlet, a valve bonnet removably mounted within said body and provided with a chamber, said chamber having inlet and outlet ports, the lower end of said bonnet being fitted in an opening of said diaphragm, a valve for the inlet port of said chamber, and a strainer connected to the lower end of said bonnet whereby the bonnet, chamber, valve and strainer may be removed as a unit from the valve body.

11. In a steam radiator valve, a valve body having an inlet and an outlet, a bonnet removably connected to the valve body and having a part contained within the latter and a part projecting therefrom, the part of the bonnet within the valve body being formed into a muffler shell, with a valve seat at the bottom thereof, a valve stem passing through the bonnet and having a valve at its lower end adapted to said seat, a handle connected to the bonnet and also to the other end of the stem, the inner end of the bonnet being passed through an opening in a diaphragm provided above the outlet, and a ferrule detachably connected to the inner end of the bonnet and carrying a strainer.

In testimony that I claim the foregoing as my own, I have hereto affixed my signature.

EDGAR C. WILEY.